(12) United States Patent
Thoreson (10) Patent No.: US 11,596,498 B2
(45) Date of Patent: Mar. 7, 2023

(54) INFLATABLE TOOTH DAM

(71) Applicant: Mark Thoreson, Madras, OR (US)

(72) Inventor: Mark Thoreson, Madras, OR (US)

( * ) Notice: Subject to any disclaimer, the term of this patent is extended or adjusted under 35 U.S.C. 154(b) by 113 days.

(21) Appl. No.: 17/086,387

(22) Filed: Oct. 31, 2020

(65) Prior Publication Data

US 2022/0133436 A1  May 5, 2022

(51) Int. Cl.
*A61C 5/82* (2017.01)

(52) U.S. Cl.
CPC ............ *A61C 5/82* (2017.02); *A61C 2201/00* (2013.01)

(58) Field of Classification Search
CPC .............................. A61C 5/82; A61C 2201/00
USPC .......................................................... 433/136
See application file for complete search history.

(56) References Cited

U.S. PATENT DOCUMENTS

| | | | | |
|---|---|---|---|---|
| 4,261,697 A * | 4/1981 | Newitter | ................. | A61C 5/82 433/137 |
| 4,721,465 A * | 1/1988 | Barasz | ..................... | A61C 5/82 433/137 |
| 6,007,334 A * | 12/1999 | Suhonen | .................. | A61C 5/88 433/80 |
| 6,439,886 B1 * | 8/2002 | Thoreson | ................. | A61C 5/88 433/155 |
| 9,060,830 B2 * | 6/2015 | Warner | .................... | A61C 5/82 |
| 9,888,981 B2 * | 2/2018 | Haws | ....................... | A61C 5/88 |
| 2017/0281310 A1 * | 10/2017 | Haws | .................. | A61C 1/0084 |
| 2022/0133436 A1 * | 5/2022 | Thoreson | ................. | A61C 5/82 433/136 |
| 2022/0133437 A1 * | 5/2022 | Thoreson | ................. | A61C 5/82 433/138 |

FOREIGN PATENT DOCUMENTS

| | | | | |
|---|---|---|---|---|
| CA | 2229403 A1 * | 8/1998 | ............... | A61C 5/88 |
| EP | 860149 A1 * | 8/1998 | ............... | A61C 5/88 |

\* cited by examiner

*Primary Examiner* — Matthew M Nelson
(74) *Attorney, Agent, or Firm* — Mark S. Hubert (57) ABSTRACT

A disposable, inflatable, matrix (tooth dam) used to form a temporary, removeable side wall for the placement of a tooth filling material. It establishes the original dental anatomy of the tooth, and maintains the correct contact between adjacent teeth for flossing purposes and gingival health. It accomplishes this by inflating a pair of self-sealing air chambers that extend from the back face of a planar panel that they are formed on, such that these chambers contact and press against the adjacent tooth and exert enough force to elastically secure the planar panel without wedges and clamps. It prevents the tooth filling material from leaving the prepared tooth and entering the space between the teeth to enhance flossing and proper dental hygiene. This device will greatly enhance patient comfort, procedural efficiency and consistency.

12 Claims, 8 Drawing Sheets

INFLATABLE TOOTH DAM

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The present disclosure relates, in general, to dentistry, and more particularly to tooth filling technology.

BACKGROUND

Tooth decay is a way of life for many people. Standard dental restorations involve the removal of decay from a tooth. After the decay has been removed and the resultant hole sterilized and dried, it is a relatively straight forward process to place restorative materials and contour to recreate normal tooth anatomy.

When the decay has penetrated the side of the tooth (marginal ridge) this side has to be partially removed. Here the job complexity goes up. With the side or marginal ridge penetrated, two things occur. First, there is no side boundary to retain the filling material and second, any filling material that does spill over between teeth, will cause complications down the road.

Currently, this situation is addressed by ensuring that there is adequate clearance between adjacent teeth by filing the space accordingly, and by placing a Toffelmire™ matrix steel band and clamp around all four sides of the tooth being repaired. These band clamps are uncomfortable and often require wedges to ensure the seal around the tooth is above the gum line, or to separate the teeth enough such that the band may be placed between them. Additionally, they can cause gum irritation. Other matrix and clamp devices are available but all use wedges for forcing the teeth apart.

Hence, an economical, disposable tooth isolating device (dam or matrix) would fulfill a long felt need in the restorative dental treatment industry. This new invention utilizes and combines known and new technologies in a unique and novel configuration to overcome the aforementioned problems and accomplish this.

BRIEF SUMMARY

In accordance with various embodiments, an inexpensive, single use inflatable dental matrix (tooth dam) is provided.

In one aspect, a marix that is easy to install and remove and can closely contour to the anatomy of posterior teeth is provided.

In another aspect, a matrix that can be installed quickly and securely without the need for additional expensive equipment.

In yet another aspect, a cutable, sterile matrix that can self-seal at any inflatable profile is provided.

Various modifications and additions can be made to the embodiments discussed without departing from the scope of the invention. For example, while the embodiments described above refer to particular features, the scope of this invention also includes embodiments having different combination of features and embodiments that do not include all of the above described features.

BRIEF DESCRIPTION OF THE DRAWINGS

A further understanding of the nature and advantages of particular embodiments may be realized by reference to the remaining portions of the specification and the drawings, in which like reference numerals are used to refer to similar components.

DETAILED DESCRIPTION OF CERTAIN EMBODIMENTS

While various aspects and features of certain embodiments have been summarized above, the following detailed description illustrates a few exemplary embodiments in further detail to enable one skilled in the art to practice such embodiments. The described examples are provided for illustrative purposes and are not intended to limit the scope of the invention.

Reference will now be made in detail to embodiments of the inventive concept, examples of which are illustrated in the accompanying drawings. The accompanying drawings are not necessarily drawn to scale. In the following detailed description, numerous specific details are set forth to enable a thorough understanding of the inventive concept. It should be understood, however, that persons having ordinary skill in the art may practice the inventive concept without these specific details. In other instances, well-known methods, procedures, components, circuits, and networks have not been described in detail so as not to unnecessarily obscure aspects of the embodiments.

It will be understood that, although the terms first, second, etc. may be used herein to describe various elements, these elements should not be limited by these terms. These terms are only used to distinguish one element from another. For example, a first attachment could be termed a second attachment, and, similarly, a second attachment could be termed a first attachment, without departing from the scope of the inventive concept.

It will be understood that when an element or layer is referred to as being "on," "coupled to," or "connected to" another element or layer, it can be directly on, directly coupled to or directly connected to the other element or layer, or intervening elements or layers may be present. In contrast, when an element is referred to as being "directly on," "directly coupled to," or "directly connected to" another element or layer, there are no intervening elements or layers present. Like numbers refer to like elements throughout. As used herein, the term "and/or" includes any and all combinations of one or more of the associated listed items.

The terminology used in the description of the inventive concept herein is for the purpose of describing particular embodiments only and is not intended to be limiting of the inventive concept. As used in the description of the inventive concept and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

In the following description, for the purposes of explanation, numerous specific details are set forth in order to provide a thorough understanding of the described embodiments. It will be apparent to one skilled in the art, however, that other embodiments of the present invention may be practiced without some of these specific details. It should be appreciated that the features described with respect to one embodiment may be incorporated with other embodiments as well. By the same token, however, no single feature or features of any described embodiment should be considered essential to every embodiment of the invention, as other embodiments of the invention may omit such features.

Unless otherwise indicated, all numbers herein used to express quantities, dimensions, and so forth, should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

As used herein, the term "matrix" refers to a device that places a sheet barrier between adjacent teeth that is contoured around one tooth by exerting force from the adjacent tooth.

There have been several tooth dam devices utilized to seal the missing side wall of a tooth under reconstruction/filling. Most are expensive, uncomfortable and hard to install properly. U.S. Pat. No. 6,439,886 discloses a method of sealing a tooth's side wall without installing a band that completely encircles the tooth. It involves a set of three inflatable, single chamber air bags fused together that may be inserted between the teeth and inflated. Once inflated, the distal and proximal ends of the three bags contour to a limited degree such that the side wall of the front bag itself, contacts the tooth and prevents dental restorative material from flowing out. In practice, this device had a limited range of contour sealing about the tooth side wall, and placed additional pressure between the teeth when inflated.

The present invention relates to a novel design for a disposable, inflatable, matrix used to form a temporary, removeable tooth side wall for the installation of a tooth filling material. It establishes the original anatomic configuration around much of the tooth, and maintains the correct spacing between adjacent teeth for flossing purposes and tooth movement. It serves to provide a rigid panel's contoured surface between the tooth being repaired and the adjacent tooth. This panel is curved to mimic the side wall of the tooth under repair. It prevents the tooth filling material from adhering to the adjacent tooth and eliminating the interstitial space between the teeth necessary for flossing and proper dental hygiene. It also prevents the gum and lip from being pinched in one of the conventional matrix barrier bands.

Figure 2:
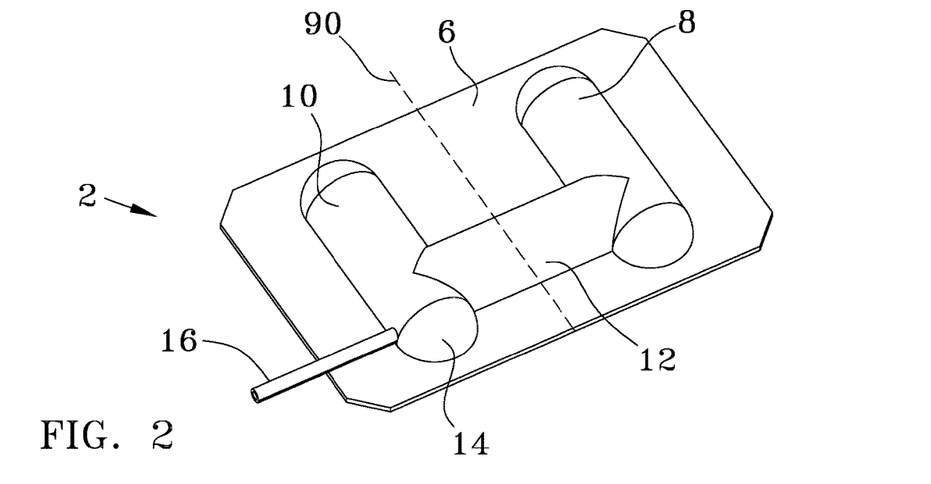
FIG. 2 is a back perspective view of the of the matrix.
Figure 3:
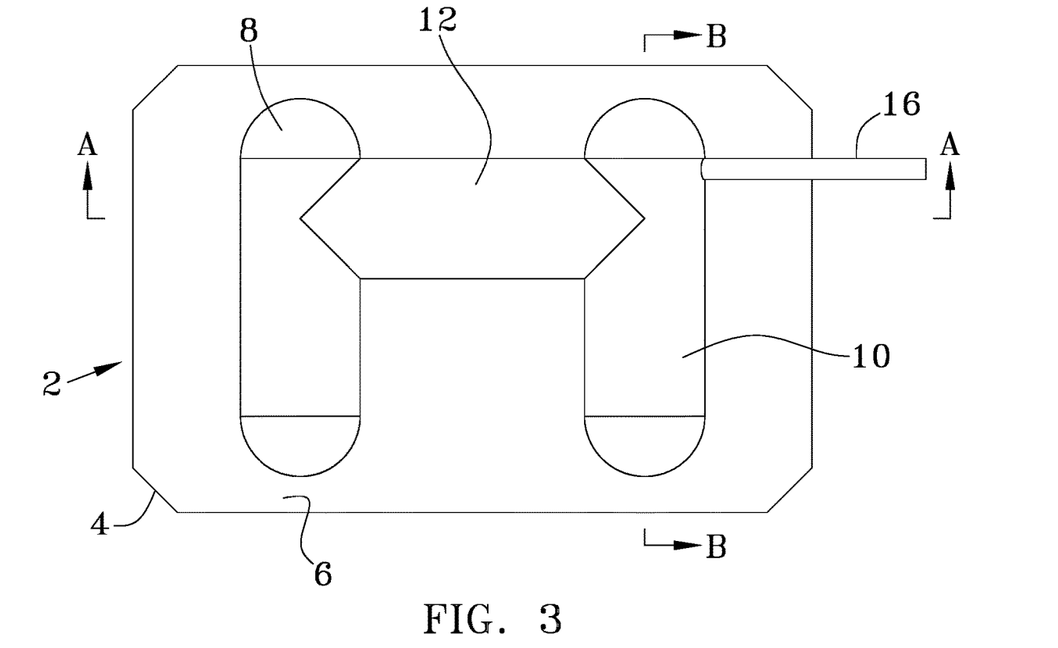
FIG. 3 is a front view of the matrix.
Figure 4:
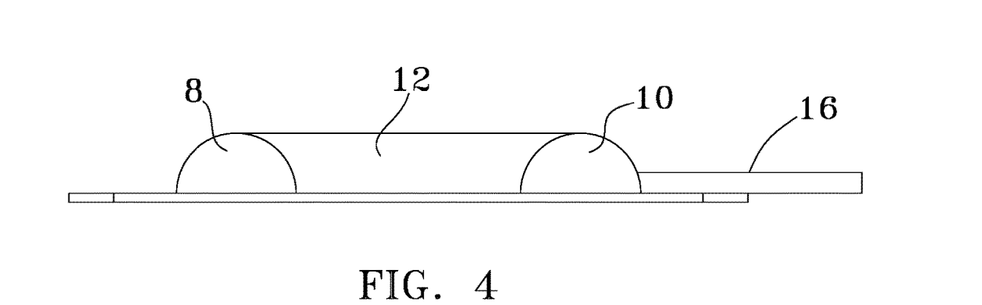
FIG. 4 is a bottom view of an inflatable matrix.
Figure 5:
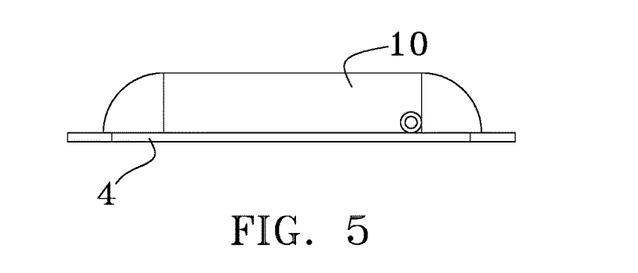
FIG. 5 is a right side view of an inflatable matrix.
Figure 6:
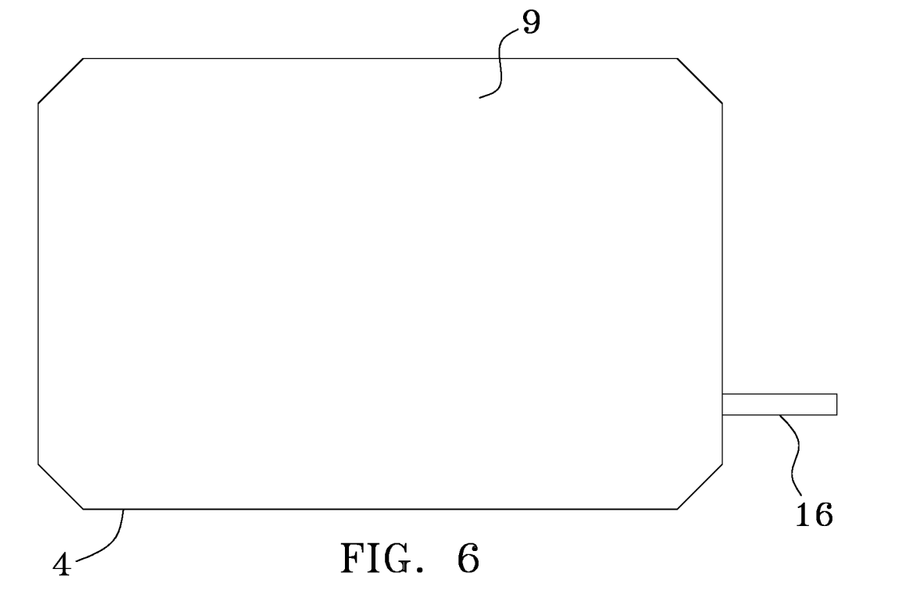
FIG. 6 is a front view of side view of an inflatable matrix.
Figure 7:
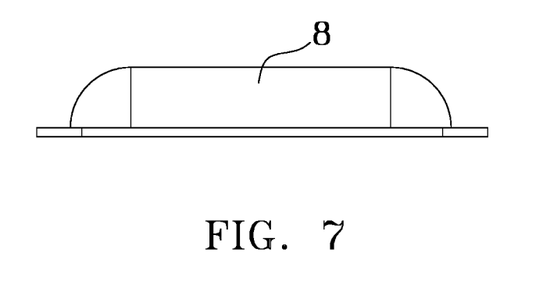
FIG. 7 is a left side view of an inflatable matrix.
Figure 8:
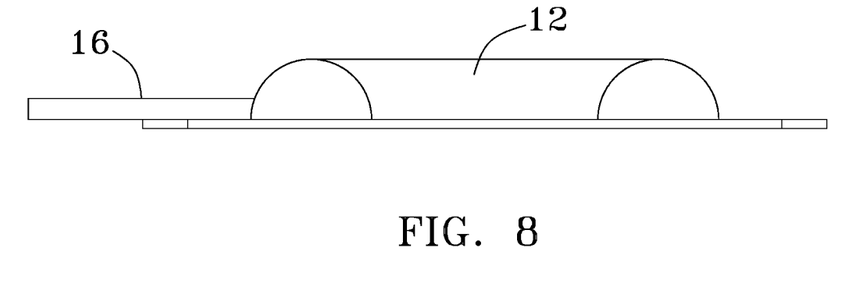
FIG. 8 is a top view of an inflatable matrix.
Figure 9:
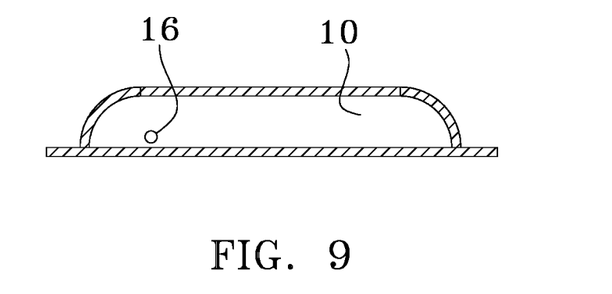
FIG. 9 is a longitudinal cross sectional view of an inflatable matrix taken through section B-B of FIG. 3.
Figure 10:
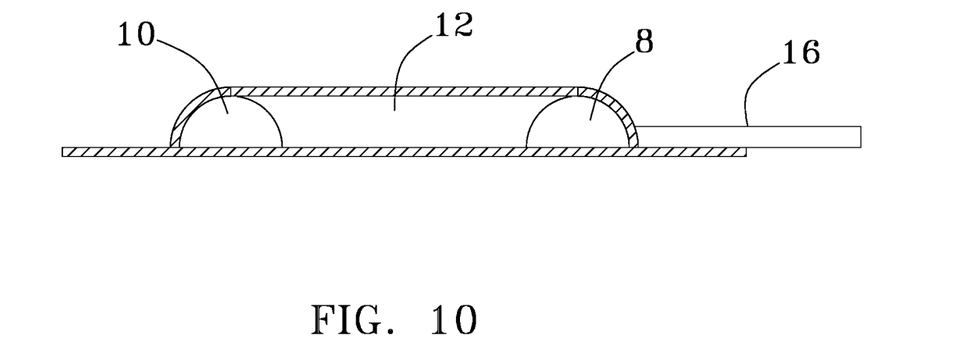
FIG. 10 is a transverse cross sectional view of an inflatable matrix taken through section A-A of FIG. 3.

Looking at FIGS. 2 and 6 of the first embodiment matrix 2, it can be seen that the device is made of a cut-able flexible, planar panel 4 of a first thickness that has polymer film 6 of a second, thinner thickness, affixed to its panel's back face. The polymer film 6 is shaped into first and second substantially similar linear air bags (linear air pockets between the panel 4 and the inner side of the polymer film 6) 8, 10 connected by an air channel 12. In the specific geometric configuration used in the preferred embodiment matrix 2, the air channel 12 is located transverse to the longitudinal arrangement of the air bags 8 and 10, intersecting them perpendicularly. While this geometric arrangement has tested well it is known that other geometric configurations of air bags 8, 10 such as square, rectangular or round will work. The height of the air bags 8, 10 is slightly larger than the height of an average human molar or premolar.

Figure 11:
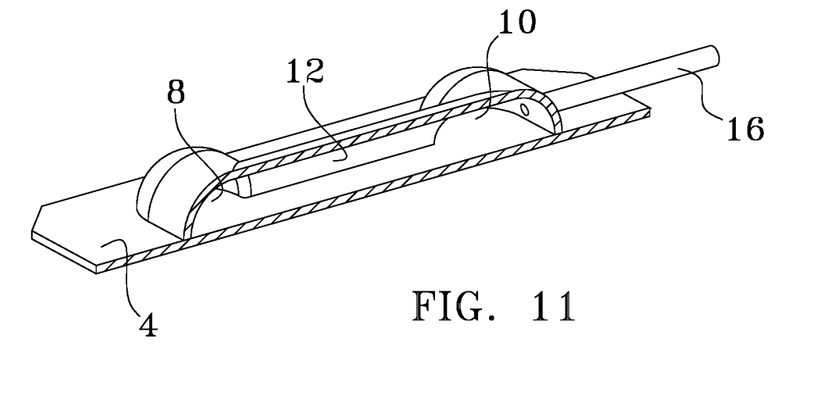
FIG. 11 is a cross sectional view of the second air bag of the preferred embodiment.
Figure 12:
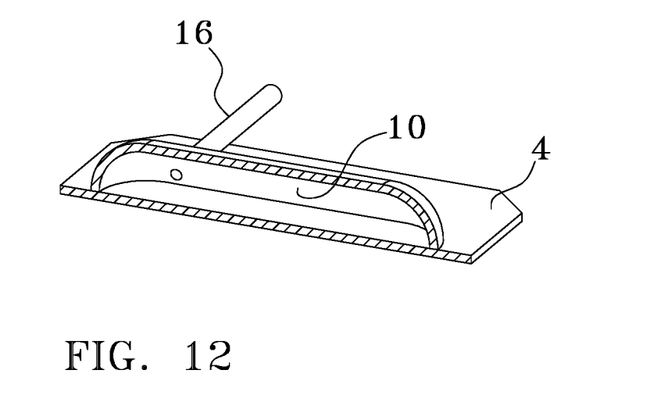
FIG. 12 is a cross sectional view of the second air bag of the preferred embodiment rotated 90 degrees.

Looking at FIGS. 3-10, it is illustrated that the air bags 8, 10 have ¼ spherical ends 14, again that may have other configurations depending on changes in fabrication tooling. Extending from one of the air bags (in the illustrated embodiment the second air bag 10) is an inflation conduit 16. In the preferred embodiment 2 the inflation conduit 16 extends beyond the extent or the peripheral edge of the panel 4. Looking at FIGS. 11 and 12 it can be best seen that the inflation conduit 16 extends and is sealed at the entry to the second air bag 10. (In the alternate embodiment matrix 50 (FIGS. 13 and 14) the inflation conduit 16 is replaced by an inflation channel 52 that is a linear section of the panel 4 that formed as a raised semi-circular passage that has its proximal opening at the top edge of the panel 4 and its distal opening in the tunnel 12, between the panel 4 and the polymer film 6). The inflatable height of the air bags 8, 10 and air tunnel 12 are identical. All three of these inflatable bodies are semi-circular in cross section. The air bags have both of their ends rounded.

Looking again at FIG. 2 it can be seen that except for the inflation conduit 16, the matrix 2 has a mirror image symmetry about its transverse axis 90. Described in geometrical terms, panel 4 is a planar substrate sheet with a thinner film affixed thereto a back face thereof, so as to form a pair of identical, parallel, linear air bag chambers therebetween, each with a semi-circular axial cross section and with spherical quadrant (hemi-hemispherical) distal and proximal ends. Parallelly, intersecting each linear air bag 8, 10 between their distal and proximal ends, is a third air bag with a substantially similar semi-circular axial cross section having a substantially similar height and width as that of the other air bags 8, 10. Overall there is a contiguous "U" shaped inflatable air bag formed on the back face of a flexible planar sheet 4 between the sheet 4 and a thin polymer film 6, with an air inflation tube 14 extending therefrom a side wall of said "U" shaped inflatable bag.

In the preferred embodiment, the planar panel 4 and the polymer film 6 are elastomeric thermoplastics or thermoset polymers with an elongation between 50 and 1000%, but preferably between 100 and 300%. The sheet 4 and the film 6 also each have a durometer between 40 A to 100 A and a thickness in the range of 0.0005" and 0.005". The panel 4 has a preferred thickness of 0.05". The film 6 is thinner and bonded in the non-inflatable areas to the thicker panel 4. This may be accomplished in a plethora of different polymer fabrication methods as is well known in the field. This may be by electron beam welding, heat welding, pressure sensitive adhesion, gluing, crimping and the equivalent techniques. The inflation conduit 16 has a 1-2 mm outer diameter (approximately 0.018") and an 0.2-0.5 mm internal diameter. These diameter ranges are commonly used in the medical and dental fields and secure into and onto a plethora of devices such as needles and syringe luer locks. The thickness of the sheet and panel combined is thin enough such that they can be cut or shaped for the specific situation with scissors, provided of course that the inflatable regions of the air bags 8, 10 and the air tunnel 12 are not compromised. The panel 4 has a preferred width of 0.591" and a preferred height of 0.39". The preferred height of the air bags is 0.335". The air bags longitudinal center to longitudinal center is 0.30". There is an optional stiffener plate 88 that may be located at the center of the device between the fort and second air bags. This stiffener plate aids in the act of inserting the matrix 2 between the two teeth, and the subsequent alignment.

Figure 1:
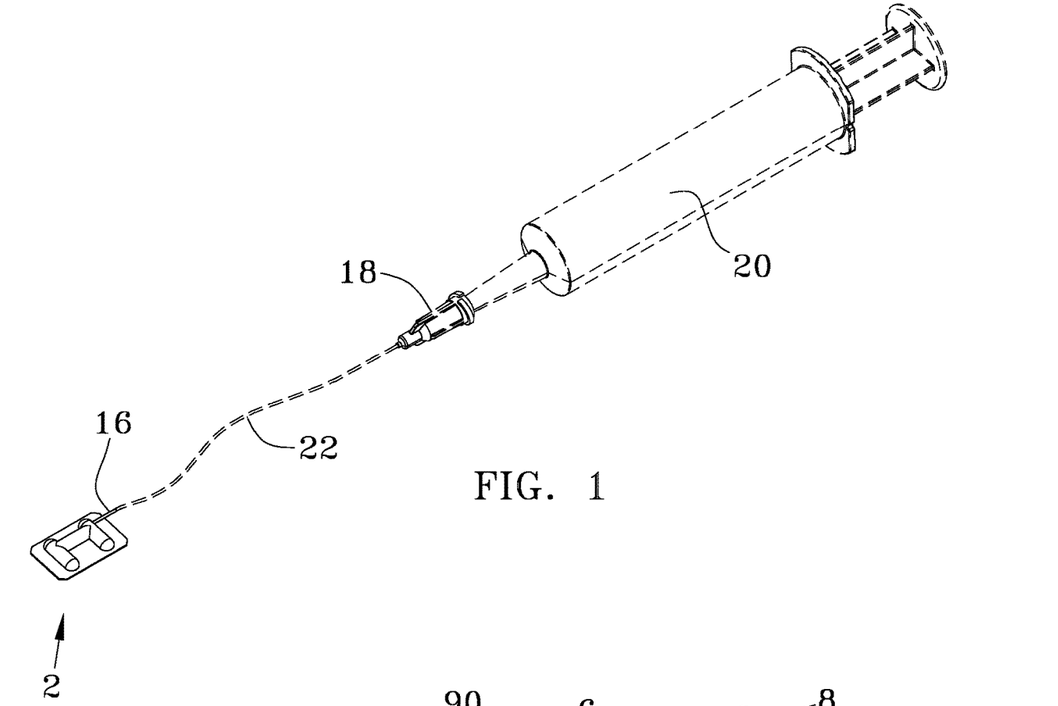
FIG. 1 is a perspective view of an inflatable matrix coupled to an inflating syringe.
Figure 15:
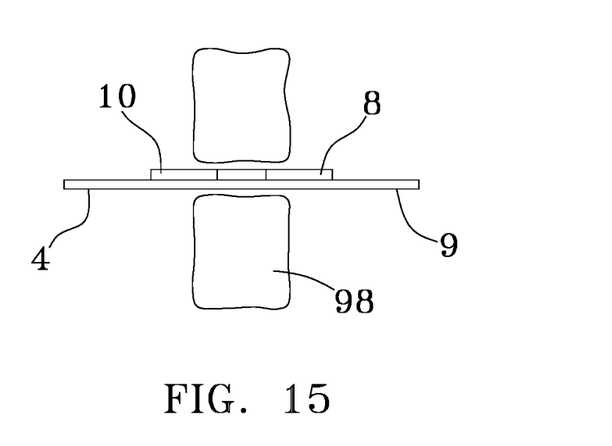
FIG. 15 is a top representative view of the uninflated preferred embodiment matrix.
Figure 16:
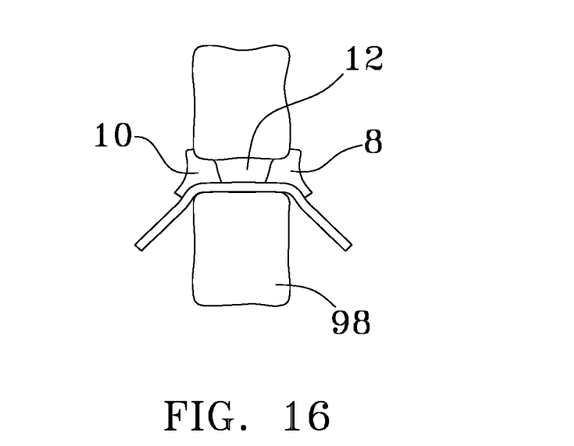
FIG. 16 is a top representative view of the inflated preferred embodiment matrix.

Looking at FIGS. 1, 15 and 16 the operation of the preferred matrix 2 and alternate embodiment matrix 50 can best be understood. The means for inflation 20 (here a syringe) has a means for sealing (here a closeable luer lock 18 coupled to an air delivery line 22). The means for sealing is capable of locking air under pressure from exiting the air bags 8, 10 and is coupled to the air inflation conduit 16 or the integrated into the inflation channel 52. The matrix is placed (air tunnel 12 first) between the two teeth with its panels' front face 9 in contact with the tooth under repair 98. (FIG. 15) The matrix 2 is slid downward until the bottom edge of its panel 4 is in contact at or slightly below the Cavo-surface gum line between the two teeth. The transverse air tunnel 12 is just above the gum line. The syringe 20 is used to pump air past the luer lock 18, down the air delivery line 22 and the inflation conduit 16 (or inflation channel 52) into the air bags 8, 10 and the air tunnel 12. As the pressure builds the polymer film 6 of air bags 8, 10 and air tunnel 12 expand outward away from the panel 4 to contact the exterior surface of the sides of the adjacent tooth 100. The lateral force exerted off of the adjacent tooth flexes and elastomerically deforms the panel 4 (FIG. 16) to wrap around the exterior surface of the tooth under repair 98. This seals the side walls of tooth under repair 98 to accept filling material. The inflated air tunnel 12 forms a cavosurface gingival margin (space) slightly above the gumline so that the filling material does not flow into the gum. When the matrix 2 has been sufficiently inflated, the luer lock is sealed. The dentist may now proceed.

The means for sealing, although depicted in the preferred embodiment as a closeable luer lock and section of tubing matingly compatible with the inflation conduit 16, can be any of a plethora of mechanical devices capable of preventing air from exiting the air bags 8, 10 including as can be seen in the alternate embodiment, a collapsible section on the inflation channel 52 itself.

Figure 13:
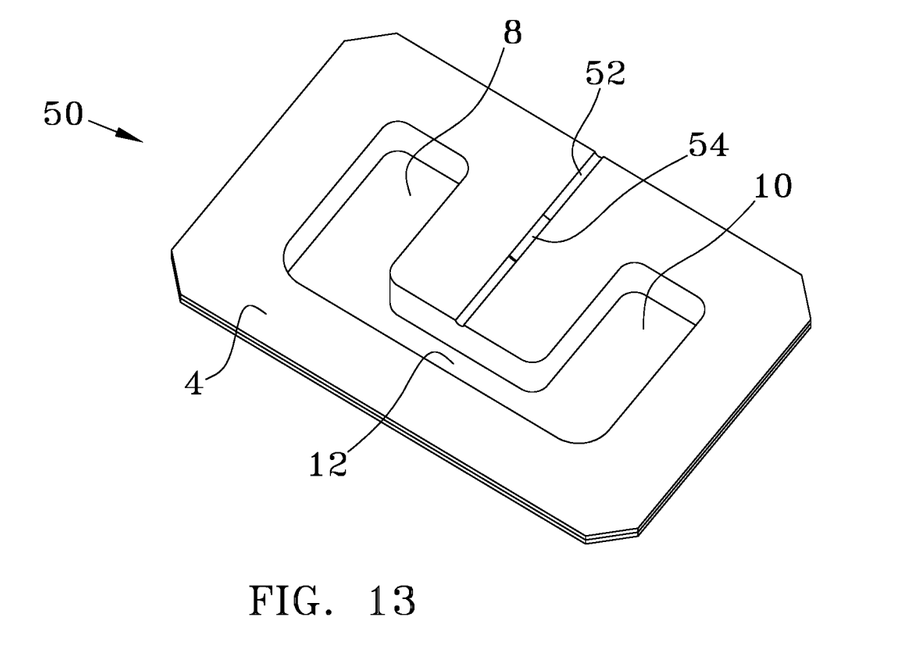
FIG. 13 is a front perspective view of the alternate embodiment inflatable matrix with the adhesive sheet removed for visual clarity.
Figure 14:
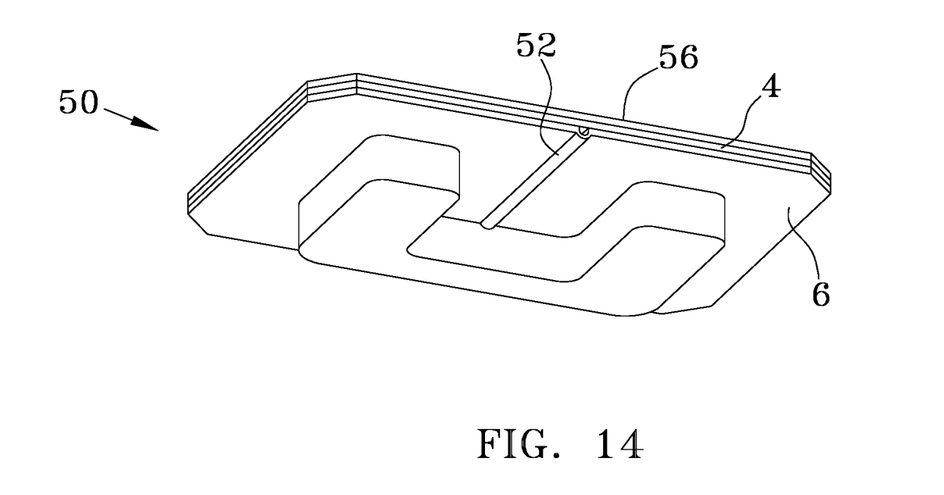
FIG. 14 is a back side perspective view of the alternate embodiment inflatable matrix.

Looking again at FIGS. 13 and 14 it can be seen that the alternate embodiment matrix 50, while similar in design and utilizing a "U" shaped inflatable section, differs in the method of construction. The alternate embodiment matrix 50 is a three-ply fabrication. It has a central planar panel 4 that has an inflation channel 52 formed thereon, along the centerline. This inflation channel 52 extends from the panel's peripheral edge into the transverse air tunnel 12, and has a collapsible section 54 there on. (In other embodiments the entire air inflation channel may be collapsible.) This inflation channel 52 is semicircular in cross section. Onto the front face of the panel 4 is bonded an adhesive sheet 56 (preferably foil). Covering all or a portion of the back face of the planar panel 4, is the polymer film 6. Similar to the preferred embodiment matrix 2, the air bags 8, 10 and the air tunnel 12 are formed therebetween the panel 4 and the foil 6. The polymer film 6 also covers the inflation channel region of the panel 4. When the air bags 8, 10 and the tunnel 12 are inflated to their desired pressure such that the panel 4 is tightly wrapped around the tooth under repair 98, the collapsible section 54 of the inflation channel 52 may be depressed so as to elastomerically deforms until it touches the adhesive sheet 56 and adheres. The collapsible section 54 of the inflation channel 52 in this embodiment thus serves as the means for sealing.

The alternate embodiment matrix 50 has the airline 22 inserted into the open end of the inflation channel 53 and inflated with the syringe 20. After air inflation of the alternate embodiment matrix 50, while still under pressure, the collapsible section 54 of the inflation channel 52 is squeezed until its inner face deforms inward and contacts the adhesive sheet 56. Here the inflation channel sticks and 12 seals the air bags 8, 10 and the air tunnel 12. The airline 22 is now able to be removed.

Figure 17:
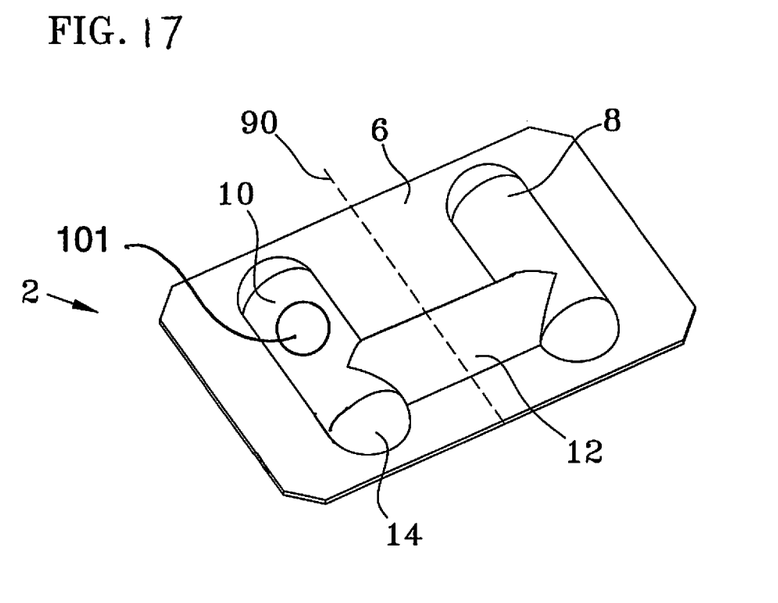
FIG. 17 is a back view of a matrix with a self-sealing inflation pad.

Looking now at FIG. 17 a one can see that this embodiment is the matrix of FIGS. 1 to 12 but with a self-sealing polymer pad 101 (a thickened disk or section) affixed anywhere on the exterior surface of the matrix 2 and the inflation conduit 16 eliminated. This device is directly inflated with an air filled syringe (although another fluid such as water would also work) that pierces through the self-sealing polymer pad 101, inflates the device to the correct configuration and pressure around the tooth and then is withdrawn.

Using this device, the setup time prior to a filling of a tooth with an eroded side wall is extremely reduced and the possibility of dental complications due to amalgam or other dental filling getting below the gumline is also greatly minimized.

While certain features and aspects have been described with respect to exemplary embodiments, one skilled in the art will recognize that numerous modifications are possible. Consequently, although several exemplary embodiments are described above, it will be appreciated that the invention is intended to cover all modifications and equivalents within the scope of the following claims.

Having thus described the invention, what is claimed as new and desired to be secured by Letters Patent is as follows:

1. A tooth dam, comprising:
    a planar substrate panel having a front face and a back face;

a polymer film affixed to said back face;

a "U" shaped inflatable air bag formed between said panel and said polymer film; and an inflation conduit extending from said air bag.

2. The tooth dam of claim 1 further comprising:

a means for inflation;

a means for sealing connected between said means for inflation and said inflation conduit.

3. The tooth dam of claim 2 wherein said means for inflation is a syringe.

4. The tooth dam of claim 2 wherein said means for inflation is a tube.

5. The tooth dam of claim 2 wherein said means for sealing is a closeable luer lock coupled to an air delivery line.

6. The tooth dam of claim 1 wherein said panel has a first thickness and said polymer film has a second thickness and said second thickness is less than said first thickness.

7. A tooth dam, comprising:

a planar substrate panel having a front face and a back face;

a first polymer film affixed to said back face;

a second film affixed to said front face;

a "U" shaped inflatable air bag formed between said panel and said polymer film; and an inflation channel formed between said panel and said second film, said inflation channel extending into said "U" shaped inflatable air channel.

8. The tooth dam of claim 7 further comprising:

a means for sealing, physically integrated with said inflation channel.

9. The tooth dam of claim 8 wherein said second film is an adhesive film and said means for sealing is a collapsible section of said inflation channel that collapses under pressure and adheringly contacts an adhesive foil to prevent escape of air from said inflatable air bag.

10. The tooth dam of claim 8 further comprising:

a means for inflation, connectable to said inflation channel.

11. The tooth dam of claim 7 wherein said "U" shaped inflatable air channel is a pair of identical, parallel air bags connected by an air tunnel that resides perpendicularly between said parallel air bags.

12. A tooth dam, comprising:

a pair of inflatable air bags extending from a substrate panel;

a front face and a back face on said substrate panel;

a polymer film affixed to said back face;

a means for inflation connectable to at least of one of said pair of inflatable air bags;

a means for sealing residing between said means for inflation and said pair of inflatable air bags;

wherein said pair of inflatable air bags are joined and configured in a "U" shaped configuration formed between said panel and said polymer film; and a self-sealing pierceable pad thereon said "U" shaped inflatable bag.

* * * * *